UNITED STATES PATENT OFFICE.

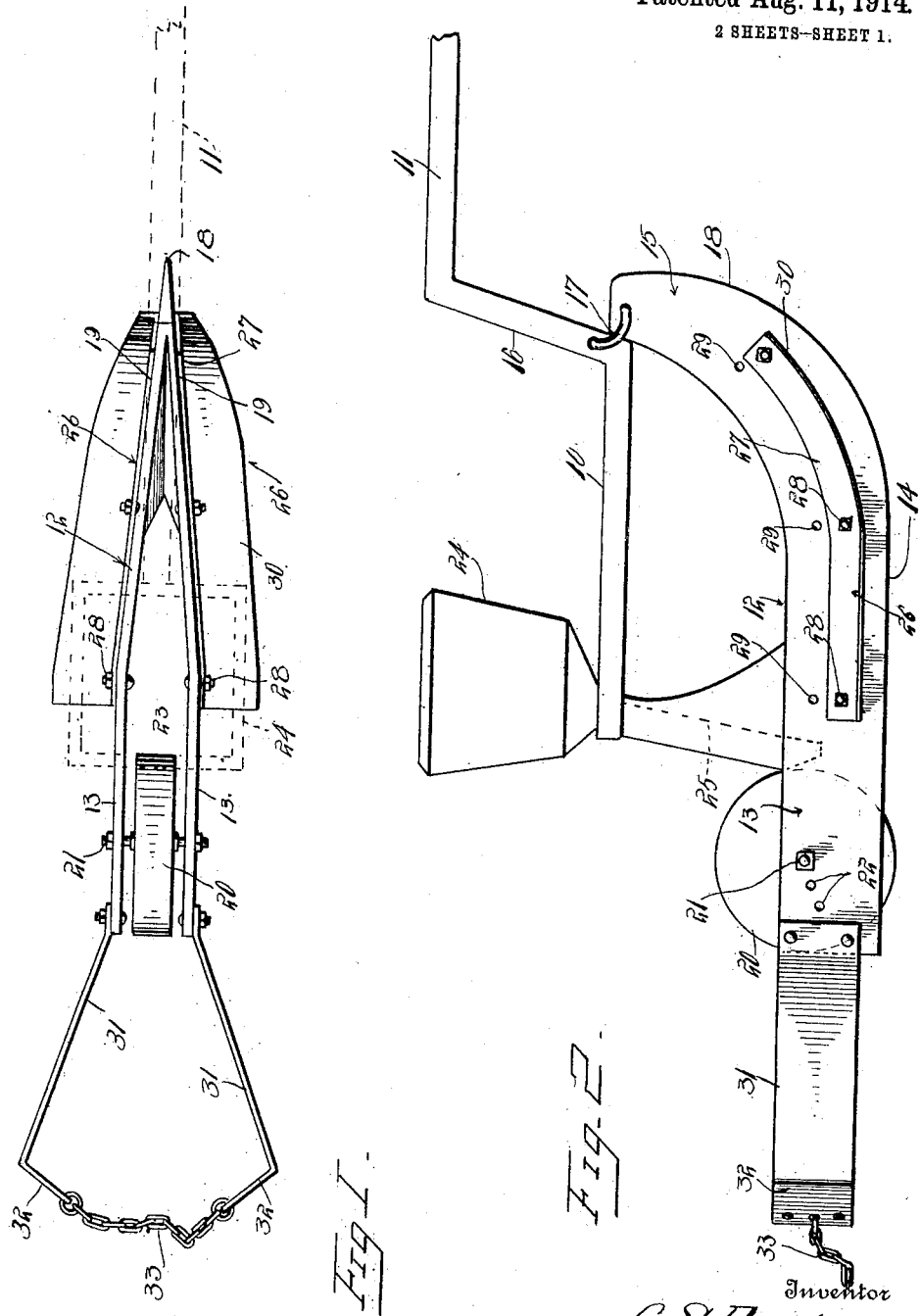

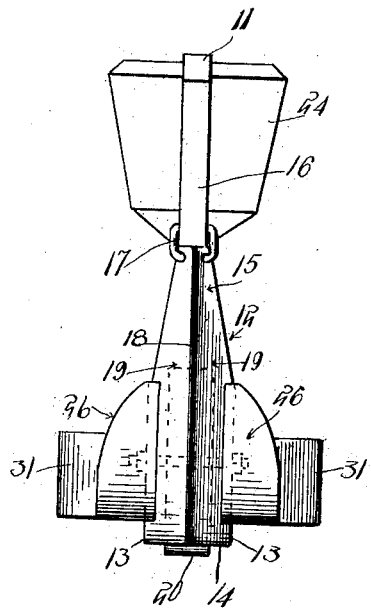

CHARLES S. PERRINE, OF FLINT, ARKANSAS.

PLANTER.

1,107,224.  Specification of Letters Patent.  Patented Aug. 11, 1914.

Application filed June 21, 1913. Serial No. 775,041.

*To all whom it may concern:*

Be it known that I, CHARLES S. PERRINE, a citizen of the United States, residing at Flint, in the county of Sharp, State of Arkansas, have invented certain new and useful Improvements in Planters; and I do hereby declare the following to be a full, clear, and exact description of the invention, such as will enable others skilled in the art to which it appertains to make and use the same.

This invention relates to means for planting seed, and while I have in the present instance described the invention in connection with the planting of corn, I wish it to be understood that it is not limited in its useful application to this particular purpose, as it may be successfully employed in the planting of seed of grain of any character.

As is well known, it is the usual practice in the planting of corn to drop the grains upon the loose soil of the furrow and then cover such grains with the loose earth by means of a covering wheel or other device carried by the corn planter. The result is that the grains are simply implanted in the loose earth of the furrow or seed bed, and consequently heavy rains are exceedingly liable to wash out the furrow or seed bed, and either entirely carry away the seed or else so distribute and change the position of the seed within the bed that an irregular growth of the plants takes place. Furthermore, such distributing or changing of the seed grains materially interferes with the growth of the plants inasmuch as such grains are frequently turned to unnatural positions and when the plants start to grow the tender roots are liable to be strained or broken. It is therefore desirable that when the seed grains, which are the seat of life of the plants, are once positioned in the furrow or seed bed, they should be maintained in such position against disturbance, such as results from heavy rains or other elemental causes, and therefore, in the present instance I have devised a means for planting seed wherein such seed is permanently embedded or pressed into the soil of the seed bed before being covered with the loose earth of the furrow.

In carrying out my invention the furrow is first opened and the grain or seed is dropped into the furrow and on the uncut soil forming the bottom of such furrow. Loose soil resulting from the cutting of the furrow is prevented dropping in on the seed until such seed has been firmly pressed or embedded into the fresh or virgin soil forming the bottom of the furrow. After this physical embedding or pressing of the seed into the uncut or virgin earth at the bottom of the furrow has taken place, such seed is covered lightly by loose or pulverized soil, the result being that the seed will germinate much sooner than in the ordinary manner, the grains will be held undisturbed in their original implanted positions, and consequently the plants in the field will grow evenly and regular.

With the above recited objects and others of a similar nature in view, my invention consists in the improved means for planting seed, set forth in and falling within the scope of the appended claims.

In the accompanying drawings, and in the following description, I have illustrated and set forth one form of machine by which my improved method may be carried into effect.

In the accompanying drawings: Figure 1 is a top plan view of one form of a machine for carrying out my invention. Fig. 2 is a side elevation thereof. Fig. 3 is a front elevation. Fig. 4 is a rear elevation. Fig. 5 is a detail perspective view of one of the runner plates for regulating the depth of the cut made by the furrow cutting shoe.

Referring to the drawings in which similar reference characters designate corresponding parts throughout the several views, 10 designates the frame of a machine to which is connected a draft member 11. A forked shoe 12 having the spaced parallel side portions 13 and a flat bottom 14 is provided with upwardly curved forward extremities 15 which may be attached to an upwardly extending front portion 16 of the frame 10 as shown at 17 so that it may be readily attached and detached therefrom when desired.

The side portions or forks 13 are brought together at the forward edge of the shoe as shown at 18 to form a sharp cutting edge adapted to cut into the earth under the weight of the machine. Such sides converge forwardly, as shown at 19, to the cutting edge, while the remaining sections of the sides, rearwardly of the converging portions 19, are disposed in approximate parallel relation for supporting a rotatable press wheel 20 journaled upon a removable bolt 21 which is adapted to be interchangeably engaged with a series of holes or openings 22 in the said sides adjacent their rear ends. These holes are located one above the other and are preferably extended in an inclined direction so as to prevent weakening of the parts and said wheel 20 operates in a slot 23 to extend beneath the lower edge of the runner or bottom of the shoe for the purpose of pressing or embedding the seed in the bottom of the furrow.

A seed box 24, of any preferred form, is mounted upon the frame 10 forwardly of the wheel 20 and is provided with a discharge spout 25 for feeding the corn or seed as the machine is advanced through a field, and by this construction the shoe operates at its pointed forward end to cut the furrow and divide the soil; thereby exposing the freshly opened or virgin soil upon which the grain or seed is dropped and as the side portions of the runner extend rearwardly of the point at which the seed is dropped, the soil is prevented from falling back into position to cover the seed or grain until after the press wheel 20 has passed thereover to force or embed the seed or grain into the freshly opened or virgin soil at the bottom of the furrow.

Angular runner plates 26 are mounted upon the outer faces of each of the side portions of the shoe and are provided with curved forward extremities 27 lying against the upwardly curved forward portions 15 of the shoe so as to offer a minimum amount of resistance in advancing over the ground, the said runner plates being adjustably connected to the sides of the shoe by means of the fastening bolts 28 extending through perforations 29 in said sides so as to raise or lower the same, and more especially their outwardly projecting bottom edges 30 relative to the bottom of the shoe to regulate the depth of planting by limiting the depth of the cutting operation of the shoe and the consequent depth of the furrow produced thereby. These runners will also operate to pulverize the soil upon opposite sides of the shoe, while suitable angle irons 31 are connected to the rear ends of the side portions of the shoe and provided with inwardly extending terminals 32 adapted to engage the turned soil in conjunction with a chain 33 connecting the terminals so as to cover the seeds and to pulverize, loosen and level the soil to assist the growth of the plants.

It will be noted that in using my invention the seed or grain are embedded or pressed bodily into the uncut soil forming the bottom of the furrow, and such seed being subsequently covered, the germination or sprouting is hastened and the vegetation increased.

What I claim is:

1. In a planter, a forked shoe, angle iron flanges of arcuate outline secured to the outer sides of the branches of said shoe, and forming flanges for deflecting the earth outwardly from said shoe, a packer wheel journaled between the branches of said shoe in rear of said flanges, a seed hopper carried by said shoe, and coverers carried by the rear edges of said shoe branches.

2. The combination with a furrow opener, of a seed dropper for depositing the seed on the hard soil in the bottom of the furrow, a guard device for holding the loose earth formed by the cutting of the furrow from falling into the latter, pressing mechanism for embedding the seed in the above-mentioned hard soil of the furrow bottom, and covering devices for filling the furrow with the loose soil after the seed has been embedded by the pressing mechanism.

In testimony whereof, I affix my signature, in the presence of two witnesses.

CHARLES S. PERRINE.

Witnesses:
O. U. SIGLER,
SUDIE WOOD.

---

Copies of this patent may be obtained for five cents each, by addressing the "Commissioner of Patents, Washington, D. C."